(12) United States Patent
Ross

(10) Patent No.: US 7,620,416 B2
(45) Date of Patent: Nov. 17, 2009

(54) TRANSMISSION POWER NORMALIZATION

(75) Inventor: Rony Ross, Haifa (IL)

(73) Assignee: Intel Corporation, Santa Clara, CA (US)

( * ) Notice: Subject to any disclaimer, the term of this patent is extended or adjusted under 35 U.S.C. 154(b) by 641 days.

(21) Appl. No.: 11/540,225

(22) Filed: Sep. 29, 2006

(65) Prior Publication Data

US 2008/0081654 A1    Apr. 3, 2008

(51) Int. Cl.
*H04B 7/00* (2006.01)
*H04Q 7/20* (2006.01)
(52) U.S. Cl. .................. 455/522; 455/13.4; 455/127.1; 455/69

(58) Field of Classification Search .............. 455/13.4, 455/127.1, 127.2, 500, 522, 67.11, 69, 450, 455/453, 41.2, 115.1; 375/219–221, 267
See application file for complete search history.

(56) References Cited

U.S. PATENT DOCUMENTS

| | | | | |
|---|---|---|---|---|
| 2006/0166677 | A1* | 7/2006 | Derakshan et al. | 455/453 |
| 2006/0291544 | A1* | 12/2006 | Fischer et al. | 375/219 |
| 2007/0264941 | A1* | 11/2007 | Trainin | 455/69 |
| 2008/0003948 | A1* | 1/2008 | Mitran | 455/67.11 |

\* cited by examiner

*Primary Examiner*—Sujatha Sharma
(74) *Attorney, Agent, or Firm*—Lee & Hayes, PLLC

(57) ABSTRACT

Embodiments of transmission power normalization are presented herein.

20 Claims, 4 Drawing Sheets

TRANSMISSION POWER NORMALIZATION

BACKGROUND

The desire by users to interact with devices that provide wireless communication is ever increasing. For example, rather than use a wired connection that limits the mobility of a device having the connection, users may utilize a wireless phone, a laptop computer, a desktop computer, and so on to access a network, such as to surf the Internet, communicate with other wireless devices, and so on. To address this ever increasing desire and the corresponding increasing prevalence of devices configured to provide wireless communication, techniques have been developed to expand wireless functionality, such as to increase bandwidth, range and so on of a wireless channel used to communicate.

One such technique is referred to as "beam forming", in which, transmissions performed by a device are focused toward a target device. Traditional techniques that were used to form a beam formed connection, however, did not address automatic gain control functionality that may be employed by the target device. Therefore, a device attempting to form a beam-formed communication channel with the target device may not obtain an accurate "view" of the communication medium used to communicate between the devices, which may adversely affect the beam-formed communication channel that is formed.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

In the following discussion, an exemplary environment is first described that is operable to perform techniques to normalize transmission power. Exemplary procedures are then described that may be employed in the exemplary environment, as well as in other environments.

Exemplary Environment

Figure 1:
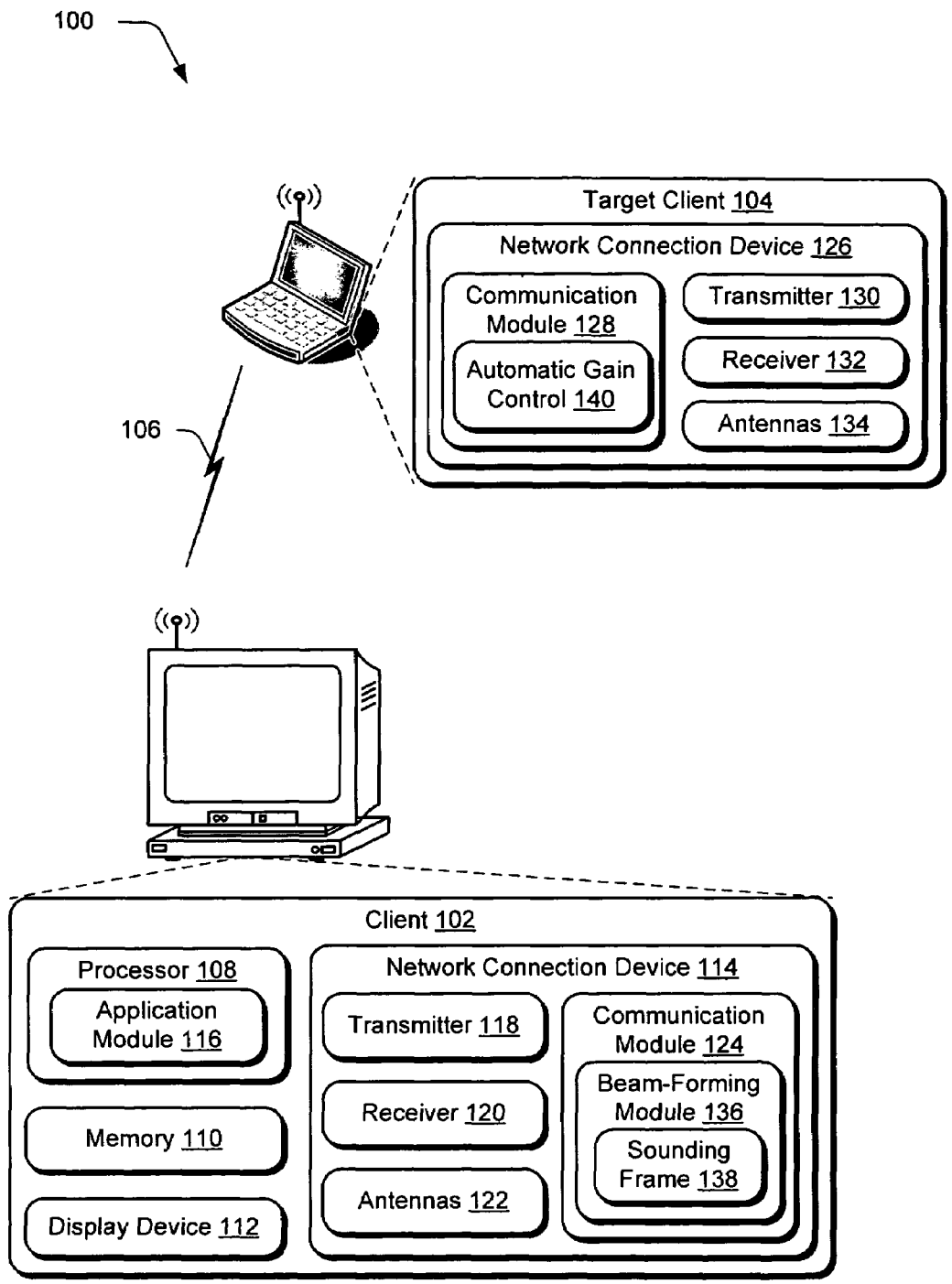
FIG. 1 is an illustration of an environment in an exemplary implementation that is operable to employ transmission power normalization techniques that address automatic gain control that may be employed by a target client.

FIG. 1 is an illustration of an environment 100 in an exemplary implementation that is operable to employ transmission power normalization techniques that address automatic gain control that may be employed by a target client. The illustrated environment 100 includes a client 102 communicatively coupled to a target client 104 over a wireless channel 106.

The client 102 and the target client 104 may be configured in a variety of ways for network 106 access. For example, one or more of the clients 102, 104 may be configured as a computing device, such as a desktop computer, a mobile station, an entertainment appliance, a wireless phone, a personal digital assistant (PDA), and so forth. The client 102 and the target client 104, in portions of the following discussion, may also relate to a person and/or entity that operate the clients. In other words, the clients 102, 104 may describe logical clients that include users, software, and/or devices.

The client 102, as illustrated, includes a processor 108, memory 110 (e.g., dynamic random access memory), a display device 112 and a network connection device 114. The processor 108 is further illustrated as executing an application module 116, which is storable in memory 110. The application module 116, for instance, may be configured to provide data to be transmitted by the network connection device 114, to be displayed by the display device 112, and so on.

Processors are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions. Additionally, although a single memory 110 is shown, a wide variety of types and combinations of memory may be employed, such as random access memory (RAM), hard disk memory, removable medium memory, and other types of computer-readable media.

The network connection device 114 includes a transmitter 118, a receiver 120, antennas 122 and a communication module 124. The antennas 122, for instance, may be used to support multiple input/multiple output (MIMO) communication. For example, the antennas 122 may be used to increase transmission power (e.g., which may be related to a square of the number of antennas), increase reception power (e.g., which may be expressed as a linear function of the number of antennas), and so on. A variety of other instances are also contemplated, further discussion of which may be found below.

The communication module 124 is representative of functionality that is employable by the client 102, and more particularly the network connection device 114 in the illustrated example, to manage wireless communication, such as with the target client 104 over the wireless channel 106. The communication module 124, for instance, may employ functionality to negotiate the wireless channel 106 with a network connection device 126 of the target client 104 that also includes a communication module 128, a transmitter 130, a receiver 132 and antennas 134. For example, the communication module 124 of the network connect device 114 may communicate with the communication module 128 of the network connection device 126 of the target client 104 to negotiate protocols that are to be used to form and communicate over the wireless channel 106. A variety of techniques may be used to form the wireless channel 106.

One such technique is referred to as "beam forming". The communication module 124, for instance, may incorporate a beam forming module 136 which is representative of functionality to form a beam-formed communication channel between the client 102 and the target client 104. When the wireless channel 106 is beam-formed, transmissions performed by the client 102 are focused toward the target client 104, with transmissions to other directions being minimized.

In order to form the beam-formed communication channel 106, for instance, the beam-forming module 136 forms a sounding frame 138 to be transmitted to the target client 104. The target client 104 receives the sounding frame 138 and transmits a response that describes how the sounding frame 138 "looks" to the target client 104. Therefore, the client 102 may determine from the response one or more conditions of the communication medium between the client 102 and the target client 104 and how those conditions affect transmission of frames between the clients.

The target client 104, however, may incorporate automatic gain control 140 to equalize frames received by the receiver 132 for subsequent demodulation. Thus, the automatic gain control 140 may influence the "view" of the wireless channel 106 between the client 102 and the target client 104. For example, a beam-formed frame transmitted from client 102 to the target client 104 may cause the automatic gain control 140 to be set at a certain level, i.e., a certain amount of gain.

Traditional techniques that were used to form a beam formed connection, however, did not address automatic gain control. For instance, a traditional sounding frame that was transmitted using traditional techniques generally had an amount of transmission power that was lower than the transmission power used to transmit a beam-formed frame. Therefore, gain set by the automatic gain control 140 for the traditional sounding frame may be different than how gain is to be set when receiving a beam-formed frame. This difference in gain may therefore result in an inaccurate view of wireless channel 106 by the beam-forming module 136, which may result in degradation in beam forming performance.

The beam-forming module 136, therefore, may incorporate one or more techniques to normalize transmission power of the sounding frame 138 to approximate that of a beam-formed frame and/or to normalize transmission power of the beam-formed frame to that of the sounding frame 138. In this way, the beam-forming module 136 may obtain an accurate view of a wireless medium between the clients 102, 104 and configure the beam-formed communication channel 106 accordingly. A variety of techniques may be employed to normalize transmission power of a sounding frame 138, further discussion of which may be found in relation to the following figures.

Generally, any of the functions described herein can be implemented using software, firmware, hardware (e.g., fixed logic circuitry), manual processing, or a combination of these implementations. The terms "module," "functionality," and "logic" as used herein generally represent software, firmware, hardware, or a combination thereof. In the case of a software implementation, for instance, the module, functionality, or logic represents program code that performs specified tasks when executed on a processor (e.g., CPU or CPUs). The program code can be stored in one or more computer readable memory devices, e.g., memory 110. The features of the techniques described below are platform-independent, meaning that the techniques may be implemented on a variety of commercial computing platforms having a variety of processors.

Figure 2:
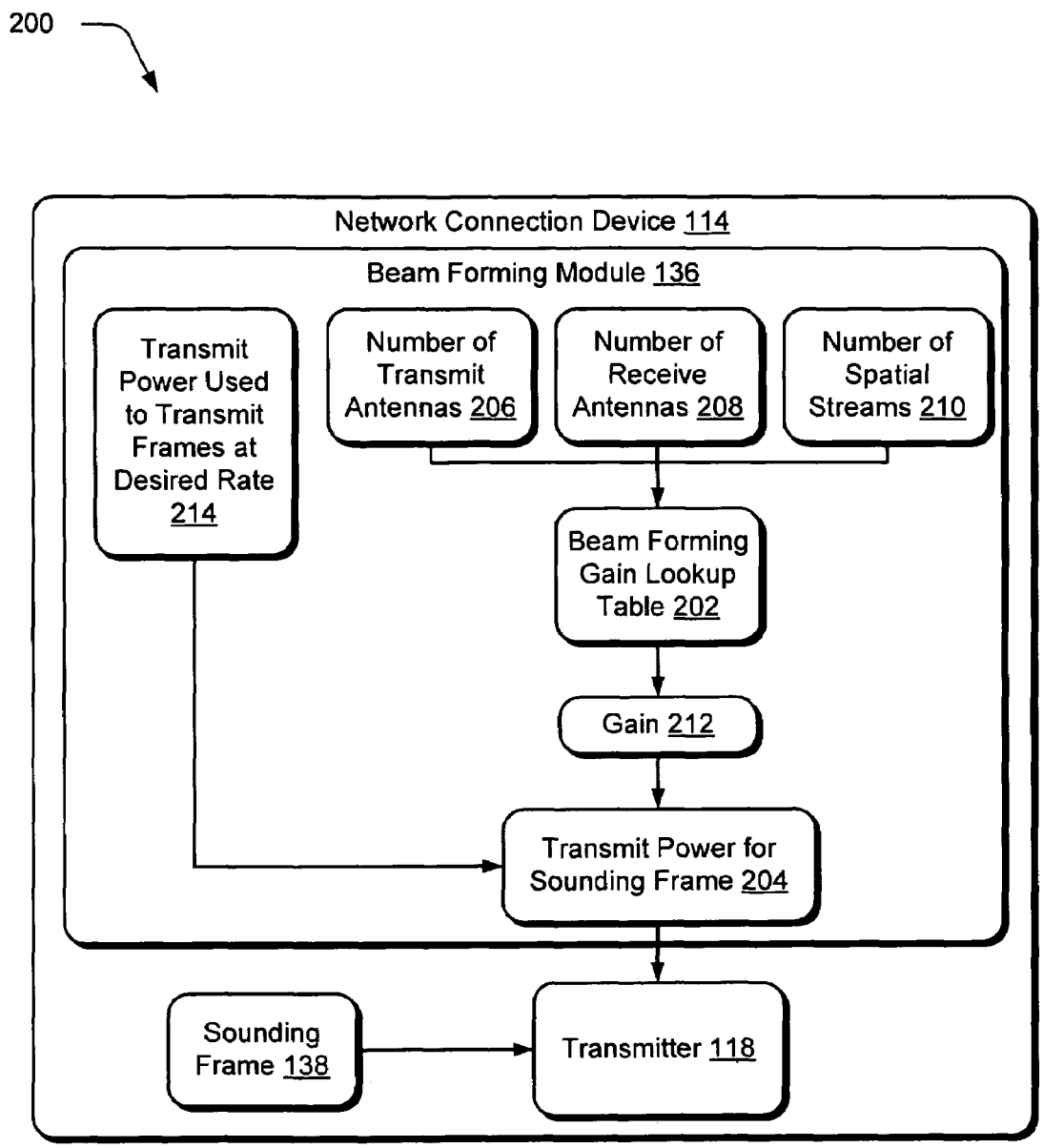
FIG. 2 is an illustration of a system in an exemplary implementation showing a beam-forming module of FIG. 1 in greater detail.

FIG. 2 is an illustration of a system 200 in an exemplary implementation showing the beam forming module 136 of the network connection device 114 of the client 102 of FIG. 1 in greater detail. The system 200 of FIG. 2 includes a beam forming gain lookup table 202 that is used to calculate transmission power for a sounding frame 204 to be used by the transmitter 118.

The beam forming module 136, for instance, may receive inputs that describe a number of transmit antennas 106, number of receive antennas 208 and a number of spatial streams 210 to be used in a beam formed wireless connection. The number of spatial streams, for instance, may describe an instance in which multiple antennas are used to transmit a single stream. These inputs may then be used as a lookup in the beam forming gain lookup table 202 to arrive at a gain 212 to be added to transmit power used to transmit frames at a desired rate 214. The gain 212 and the transmit power used to transmit frames at a desired rate 214 may then be used to arrive at the transmit power for the sounding frame 204. The beam forming gain lookup table 202 may be formed in a variety of ways, such as through simulation, further discussion of which may be found in relation to the following exemplary procedures.

Although this implementation, described use of the beam forming gain lookup table 202 to normalize the transmission power of the sounding frame 204 to that of a beam-formed frame, this technique may also be applied to normalize the beam-formed frame to the sounding frame. In this way, the same amount of automatic gain may be encountered by the sounding packet as well as the beam-formed frames.

Exemplary Procedures

The following discussion describes transmission power normalization techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the system 200 of FIG. 2.

Figure 3:
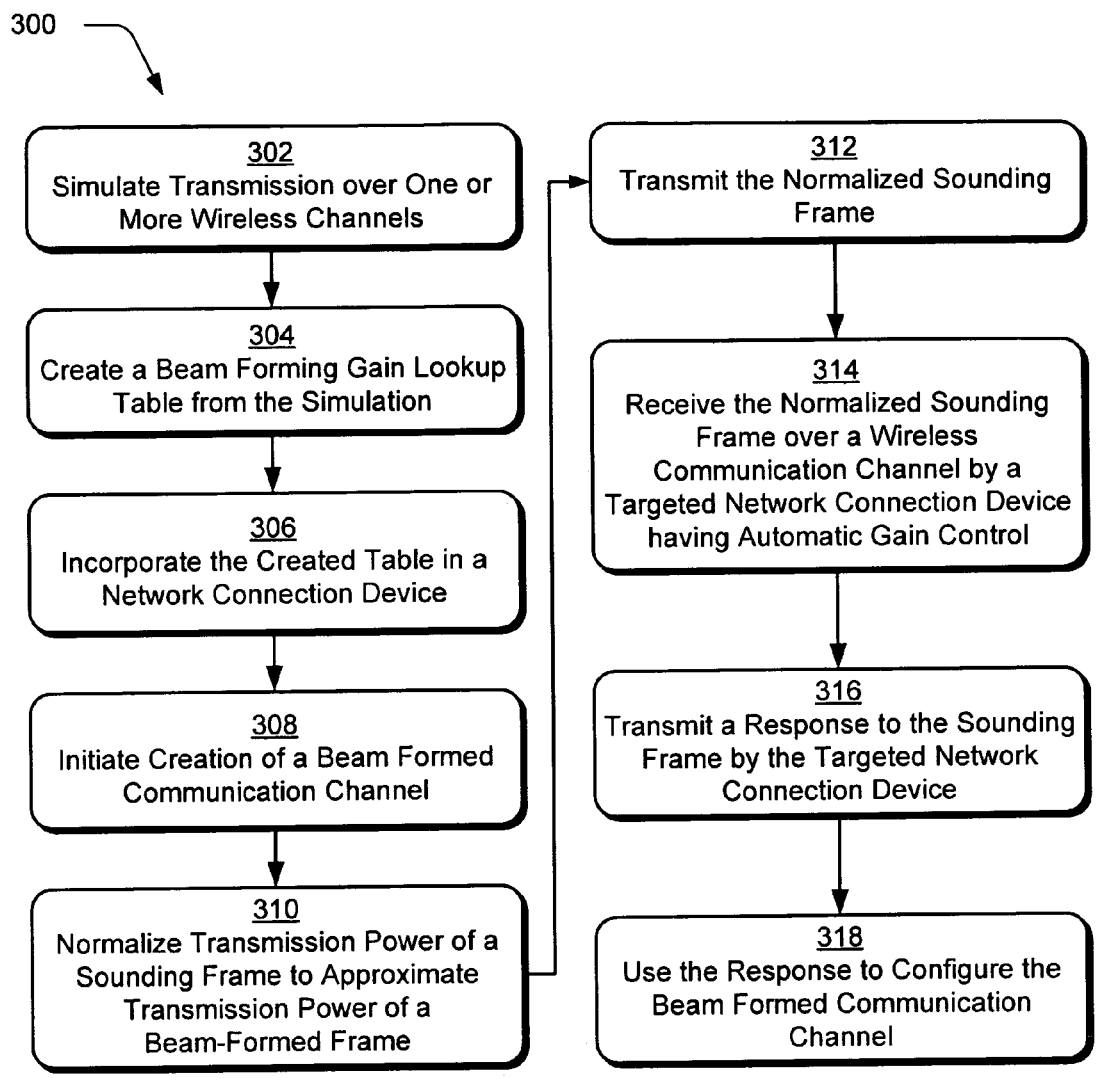
FIG. 3 is a flow diagram depicting a procedure in an exemplary implementation in which a table is created through a simulation that is useable to determine an amount of gain to be applied to adjust transmission power of a sounding frame. The sounding frame is used, at least in part, to form a beam-formed wireless channel.

FIG. 3 depicts a procedure 300 in an exemplary implementation in which a table is created through a simulation that is useable to determine an amount of gain to be applied to adjust transmission power of a sounding frame. Transmission over one or more wireless channels is simulated (block 302). For example, the affects of a wireless medium on a variety of different configurations of a network connection device may be simulated, such as based on a number of transmitting antennas, streams and/or receiving antennas, further discussion of which may be found in relation to FIG. 4.

A beam forming gain lookup table is created from the simulation (block 304). The table, for instance, may be configured as a three-dimensional lookup table that accepts, as inputs, the different configurations that were simulated for a network connection device. The created table may then be incorporated within a network connection device (block 306), such as stored in memory, formed in hardware, and so on.

The network connection device, having the table, may then initiate creation of a beam formed communication channel (block 308). For example, the network connection device may form a sounding frame. The network connection device may then normalize transmission power of the sounding frame to approximate transmission power of a beam-formed frame (block 310) and then transmit the normalized sounding frame (block 312).

The network connection device, for instance, may make a determination that beam formed frames are to be transmitted having certain characteristics (e.g., by a number of antennas using a particular transmission power) and configure transmission of the sounding frame to mimic those characteristics.

The normalized sounding frame may be received over a wireless communication channel by a targeted network connection device having automatic gain control (block 314). The targeted network connection device, for instance, may set gain by the automatic gain control to an amount that approximates gain that would be used upon reception of a beam-formed frame. Additionally, the sounding frame may cause the targeted network connection device to transmit a response to the sounding frame (block 316) The response, for instance, may describe how the sounding frame "appears" to the targeted network connection device, when received, such as due to interference caused by the wireless medium.

The response may then be used to configure the beam formed communication channel (block 318), such as by giving an "understanding" to the network connection device that transmitted the sounding frame as to how the communication channel and the wireless medium between the network connection device affects transmission of frames. Further, this understanding takes into account a likely setting of the automatic gain control when receiving beam formed frames, and therefore accurate knowledge of the channel is used to perform beam forming calculations. Normalization of the transmission power of the sounding frame may be performed in a variety of ways, an example of which may be found in the following procedure.

Figure 4:
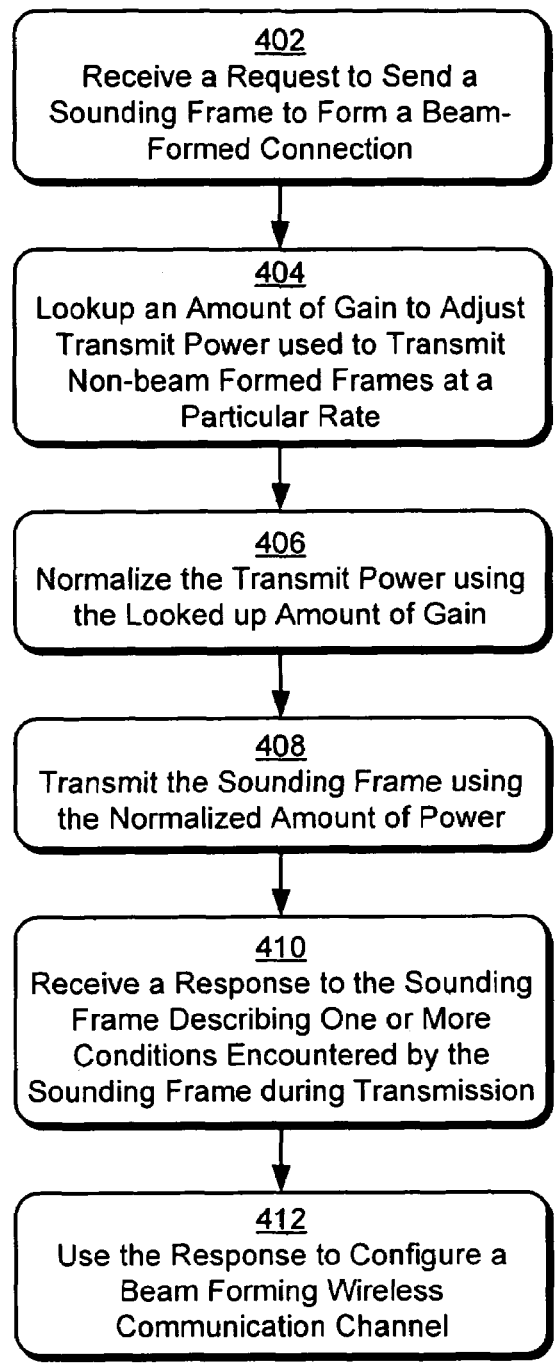
FIG. 4 is a flow diagram depicting a procedure in an exemplary implementation in which a beam forming gain lookup table is used to normalize transmission power for a sounding frame used to form a beam-formed communication channel.

FIG. 4 depicts a procedure in an exemplary implementation in which a beam forming gain lookup table is used to normalize transmission power for a sounding frame used to form a beam-formed communication channel. A request is received to send a sounding frame to form a beam-formed connection (block 402).

A lookup is performed to determine an amount of gain to adjust transmit power used to transmit non-beam formed frames at a particular rate (block 404). The lookup, for instance, may use a number of transmit antennas 206, number of receive antennas 208 and a number of spatial streams 210 to be used in the beam-formed connection as a lookup in the beam forming gain lookup table 202. An output of the lookup is the gain 212 that is applied to transmit power used to transmit frames at a desired rate 214 in a non-beam formed connection, i.e., used to transmit a "conventional" frame. The gain 212 may then be used to normalize the transmit power (block 406).

The sounding frame is transmitted using the normalized amount of power (block 408). A response to the sounding frame is received that describes one or more conditions encountered by the sounding frame during transmission (block 410). The response, for instance, may be a re-transmittal of the sounding frame such that the communication module 124 of the client 102 may determine "what happened" to the sounding frame during transmission through the wireless medium. The communication module may then use the response to configure a beam-forming wireless communication channel (block 412), such as to address the conditions of the sounding frame encountered by adjusting transmission power, error correction techniques, protocol used, and so on.

As previously described, it should be readily apparent that the techniques of the procedures 300, 400 of FIGS. 3 and 4 may also be applied to normalize transmission power of a beam-formed frame to approximate that of the sounding frame. For example, the beam forming gain lookup table may be used to normalize the transmission power of the beam-formed frames to approximate that used by the sounding frame. In another example, tables may be used to normalize both types of frames. A variety of other examples are also contemplated.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. An apparatus comprising:
    a transmitter; and
    a communication module to normalize transmission power of the transmitter to transmit one or more sounding frames to approximate that of a beam formed frame, wherein the one or more sounding frames are to form a beam-formed connection.

2. An apparatus as described in claim 1, wherein the transmission power of the sounding frame approximates that of the beam formed frame such that a network connection device having active gain control that receives the sounding frame does not adjust gain from that used upon reception of the beam formed frame.

3. An apparatus as described in claim 1, wherein the transmission power is normalized based at least in part on a number of transmit antennas to be used by the beam-formed connection.

4. An apparatus as described in claim 1, wherein the transmission power is normalized based at least in part on a number of spatial streams to be used by the beam-formed connection.

5. An apparatus as described in claim 1, wherein the transmission power is normalized based at least in part a number of receive antennas to be used by the beam-formed connection.

6. An apparatus as described in claim 1, wherein the transmission power is normalized through calculation of gain to be applied to transmission power useable by the transmitter to transmit frames at a predetermined rate of non-beam formed frames.

7. An apparatus as described in claim 1, wherein the communication module is further configured to cause the transmitter to transmit the one or more sounding frames and receive a response to the frame that is usable to form the beam-formed wireless connection, wherein the response describes one or more conditions of a wireless medium encountered by the one or more sounding frames when transmitted.

8. A method comprising:
    forming a frame to initiate a beam-formed wireless connection; and
    setting transmission power to be used to transmit the frame to approximate transmission power used to transmit a beam-formed frame.

9. A method as described in claim 8, wherein:
    the frame is configured as a sounding frame; and
    the setting is based at least in part on a number of transmit antennas, a number of spatial streams, and a number of receive antennas to be used in a beam-formed connection.

10. A method as described in claim 8, wherein the setting including applying an amount of gain to an amount of transmission power used to transmit frames at a predetermined rate without beam forming.

11. A method as described in claim 8, further comprising:
    transmitting the frame to be received by a network connection device; and
    receiving a response to the frame that is usable to form the beam-formed wireless connection.

12. A method as described in claim 11, wherein the received response describes one or more conditions of a wireless medium encountered by the frame when transmitted.

13. A method as described in claim 11, further comprising forming the beam-formed wireless connection based at least in part on the received response.

14. One or more computer-readable media comprising executable instruction that, when executed, direct a client to query a table to determine an amount of gain to apply to a sounding frame to form a beam-formed wireless connection.

15. One or more computer-readable media as described in claim 14, wherein the query is based on a number of transmit antennas, a number of spatial streams and a number of receive antennas to be used by the beam-formed wireless connection.

16. One or more computer-readable media as described in claim 14, wherein the amount of transmission power is normalized to approximate an amount of transmission power to be used to transmit a beam-formed frame.

17. A system comprising:

a processor;

dynamic random access memory memory configured to maintain one or more application modules that are executable on the processor; and a network connection device having a module to adjust transmission power of a transmitter such that beam-formed frames used in a beam-formed wireless connection have transmission power that approximates that of a sounding frame used to form the beam-formed connection.

18. A system as described in claim 17, wherein the beam-formed wireless connection is configured to transmit data related to execution of the one or more application modules.

19. A system as described in claim 17, wherein the adjustment is to be determined based on table lookup using a number of transmit antennas, number of spatial streams and number of receive antennas.

20. A system as described in claim 19, wherein the adjustment in the table is based on a simulation.

* * * * *

UNITED STATES PATENT AND TRADEMARK OFFICE
CERTIFICATE OF CORRECTION

PATENT NO.       : 7,620,416 B2                                   Page 1 of 1
APPLICATION NO.  : 11/540225
DATED            : November 17, 2009
INVENTOR(S)      : Rony Ross It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 690 days.

Signed and Sealed this

Twenty-sixth Day of October, 2010

David J. Kappos
*Director of the United States Patent and Trademark Office*